(12) United States Patent
Otsuka et al.

(10) Patent No.: US 7,748,050 B2
(45) Date of Patent: Jun. 29, 2010

(54) OPTICAL DISC, ILLEGAL COPY FINDING SYSTEM AND METHOD USING OPTICAL DISC, OPTICAL DISC MANUFACTURING APPARATUS AND OPTICAL DISC MANUFACTURING METHOD

(75) Inventors: Masato Otsuka, Minato-ku (JP); Eiji Sahota, Ashigarakami-gun (JP); Yoshiharu Tami, Ashigarakami-gun (JP)

(73) Assignees: Memory-Tech Corporation, Ibaraki (JP); Hitachi Computer Peripherals Co., Ltd., Kanagawa (JP)

( * ) Notice: Subject to any disclaimer, the term of this patent is extended or adjusted under 35 U.S.C. 154(b) by 67 days.

(21) Appl. No.: 10/589,503

(22) PCT Filed: Feb. 16, 2005

(86) PCT No.: PCT/JP2005/002828

§ 371 (c)(1),
(2), (4) Date: Aug. 15, 2006

(87) PCT Pub. No.: WO2005/078711

PCT Pub. Date: Aug. 25, 2005

(65) Prior Publication Data

US 2007/0198794 A1 Aug. 23, 2007

(30) Foreign Application Priority Data

Feb. 16, 2004 (JP) ............................. 2004-037841

(51) Int. Cl.
*G06F 7/04* (2006.01)
(52) U.S. Cl. ...................... 726/32; 713/165; 713/193; 720/718
(58) Field of Classification Search ................. 713/189, 713/193, 165; 726/31–36; 720/718
See application file for complete search history.

(56) References Cited

U.S. PATENT DOCUMENTS

| | | | | |
|---|---|---|---|---|
| 6,097,814 A | * | 8/2000 | Mochizuki | 380/44 |
| 6,463,539 B1 | * | 10/2002 | Mochizuki | 713/193 |
| 6,615,713 B1 | * | 9/2003 | Goda et al. | 101/32 |
| 6,973,015 B1 | * | 12/2005 | Murakami et al. | 369/47.21 |
| 7,020,780 B1 | * | 3/2006 | Mochizuki | 713/193 |

(Continued)

FOREIGN PATENT DOCUMENTS

JP 10-105975 A 4/1998

(Continued)

*Primary Examiner*—Kambiz Zand
*Assistant Examiner*—Amare Tabor
(74) *Attorney, Agent, or Firm*—Bacon & Thomas, PLLC (57) ABSTRACT

An optical disc manufacturing apparatus (46) recording a BCA code constituted by plural marks and including a secret code which is modulated in a range capable of recognizing a position in a radial direction of an optical disc and/or a position in a track direction of the plural marks as the BCA code, a BCA history database (44) storing a history including a correspondence between the BCA code of an optical disc (1*a*) recording the BCA code and the secret code, and a management center (30) reading the BCA code and the secret code recorded on the optical disc so as to compare both on the basis of input of the correspondence between the BCA code and the secret code stored in the BCA history database (44) are employed, whereby an illegally manufactured optical disc (1*z*) can be easily found by inspecting the recorded BCA code and secret code.

9 Claims, 8 Drawing Sheets

U.S. PATENT DOCUMENTS

| | | | |
|---|---|---|---|
| 7,069,491 B2 * | 6/2006 | Sollish et al. | 714/758 |
| 2002/0048327 A1 * | 4/2002 | Watanabe et al. | 375/340 |
| 2004/0133794 A1 * | 7/2004 | Kocher et al. | 713/193 |
| 2006/0265752 A1 * | 11/2006 | Wei et al. | 726/26 |

FOREIGN PATENT DOCUMENTS

| | | |
|---|---|---|
| JP | 11-25464 A | 1/1999 |
| JP | 2001-076345 | 3/2001 |
| JP | 2001-195786 A | 7/2001 |
| WO | WO97/14144 | 4/1997 |

\* cited by examiner

FIG. 8 even DVDs than a range of the license of the licensed manufacturing factory arrive on the market, there is a problem that it is hard to verify that the DVD is illegally manufactured.

OPTICAL DISC, ILLEGAL COPY FINDING SYSTEM AND METHOD USING OPTICAL DISC, OPTICAL DISC MANUFACTURING APPARATUS AND OPTICAL DISC MANUFACTURING METHOD

This is a nationalization of PCT/JP2005/002828 filed Feb. 16, 2005 and published in Japanese.

1. Technical Field

The present invention relates to an optical disc in which an illegal copy of the optical disc can be easily found, an illegal copy finding system and method using the optical disc, and an optical disc manufacturing apparatus and an optical disc manufacturing method of the optical disc.

2. Background Art

In general, as a recording medium called as an optical disc, there have been known a read-only disc in which data is previously recorded in accordance with a stamping technique (CD-ROM, DVD-ROM and the like), a recordable disc in which the data is recorded by changing a reflection factor of a pigment system recording membrane (CD-R, DVD-R and the like), and a rewritable disc in which the data is recorded by changing a reflection factor of a phase change recording membrane (CD-RW, DVD-RW, DVD-RAM and the like).

Particularly, in the DVD disc among the various optical discs, there is a case that a bar-code type data called as a burst cutting area (BCA) code is recorded in an innermost periphery of the disc. The BCA code mainly aims at a copyright protection, and is recorded on the disc in the process of manufacturing the disc or after manufacturing the disc. The recording method is different in correspondence to a kind of the DVD, for example, a recording mark is generally formed by removing (burning out) a part of the reflection membrane of the disc in a radial shape by means of a dedicated apparatus (hereinafter, referred to as a BCA code recording apparatus) using a high-power laser in the case of the read-only DVD-ROM disc, by recording the mark on the basis of a change of pigment (reflection factor) of the recording membrane while using the BCA code recording apparatus in the case of the recordable DVD-R, and by leaving a non-crystallized portion in a radial shape by means of an initializing apparatus used in a crystallizing step of the phase change recording membrane in the case of the rewritable DVD-RW and DVD-RAM.

In this case, as a publication in which a technique relating to the BCA code is described, there can be listed up, for example, Japanese Unexamined Patent Publication No. 10-233019 and Japanese Unexamined Patent Publication No. 2001-76345.

DISCLOSURE OF THE INVENTION

An illegal copy of the optical disc on which the BCA code is recorded can be easily made by a person having a certain degree of technique on the basis of a progress of computer technique in recent years. In particular, in recent years, the optical disc is frequently manufactured in an oversea factory for saving the cost. In this case, if an illegal user manufactures the optical disc illegally on a holiday or the like by using a legal optical disc manufacturing apparatus, there is a problem that it is hard to discriminate whether the manufacturing optical disc is illegally manufactured or legally manufactured. In particular, with regard to the problem of the illegally manufacturing, for example, in the case of the DVD including a motion picture information which is licensed to be manufactured at a predetermined number by a licensee having a copyright, more DVDs than a range of the license of the licensed manufacturing factory arrive on the market, there is a problem that it is hard to verify that the DVD is illegally manufactured.

An object of the present invention is to provide an optical disc in which an illegal copy of the optical disc can be easily found, an illegal copy finding system and method using the optical disc, an optical disc manufacturing apparatus and an optical disc manufacturing method.

In order to achieve the object mentioned above, in accordance with a first aspect of the present invention, there is provided a read-only or rewritable or recordable optical disc comprising:

a recording membrane on which data is recorded, the data being recorded and/or reproduced by irradiation of a laser spot on the recording membrane, wherein a BCA code recorded on the recording membrane is constituted by a plurality of marks, and includes a secret code which is modulated in accordance with a previously determined procedure in a range capable of recognizing a position in a radial direction of the optical disc and/or a position in a track direction of a plurality of marks as the BCA code.

Further, in accordance with a second aspect of the present invention, there is provided an illegal copy finding system finding an illegal copy of an optical disc on which data and a BCA code are recorded, comprising:

a recording apparatus recording on the optical disc the BCA code constituted by a plurality of marks and including a secret code which is modulated in accordance with a previously determined procedure in a range capable of recognizing a position in a radial direction of the optical disc or a position in a track direction of a plurality of marks as the BCA code;

a BCA history database storing a history including a correspondence between the BCA code of the optical disc recording the BCA code and the secret code; and a management center reading the BCA code and the secret code recorded on the optical disc so as to compare both on the basis of an input of the correspondence between the BCA code and the secret code stored in the BCA history database.

Further, in accordance with a third aspect of the present invention, there is provided an illegal copy finding method of finding an illegal copy of an optical disc on which data and a BCA code are recorded, comprising:

a recording step of recording on the optical disc the BCA code constituted by a plurality of marks and including a secret code which is modulated in accordance with a previously determined procedure in a range capable of recognizing a position in a radial direction of the optical disc and/or a position in a track direction of a plurality of marks as the BCA code;

a storing step of storing a history including a correspondence between the BCA code of the optical disc recording the BCA code and the secret code in a BCA history database; and a comparing step of reading the BCA code and the secret code recorded on the optical disc so as to compare both on the basis of an input of the correspondence between the BCA code and the secret code stored in the BCA history database.

Further, in accordance with a fourth aspect of the present invention, there is provided an optical disc manufacturing apparatus manufacturing an optical disc, comprising:

a recording means for recording the BCA code constituted by a plurality of marks and including a secret code which is modulated in accordance with a previously determined procedure in a range capable of recognizing a position in a radial direction of the optical disc and/or a position in a track direction of a plurality of marks as the BCA code, on the optical disc.

Further, in accordance with a fifth aspect of the present invention, there is provided an optical disc manufacturing method of manufacturing an optical disc, comprising:

a recording step of recording the BCA code constituted by a plurality of marks and including a secret code which is modulated in accordance with a previously determined procedure in a range capable of recognizing a position in a radial direction of an optical disc and/or a position in a track direction of a plurality of marks as the BCA code, on the optical disc.

Further, in accordance with a sixth aspect of the present invention, there is provided an illegal copy finding system as recited in the second aspect mentioned above, wherein the recording apparatus comprises:

an optical head irradiating a laser spot light on the optical disc;

a BCA code memory for forming the BCA code constituted by a plurality of marks in the track direction by the laser spot light;

a secret code memory storing a secret code modulated in accordance with a previously determined procedure within a range capable of recognizing positions in the radial direction of the optical disc and/or positions in the track direction of a plurality of marks forming the BCA code as the BCA code, with respect to the BCA code stored in the BCA code memory; and a microprocessor controlling the BCA code and the secret code with respect to the optical head output control portion, and wherein the microprocessor constitutes an optical disc manufacturing apparatus or a BCA code recording apparatus which records the BCA code including the secret code on the optical disc surface by modulating the BCA code by using the secret code stored in the secret code memory while moving an optical head in the radial direction of the optical disc.

Further, in accordance with a seventh aspect of the present invention, there is provided an optical disc manufacturing apparatus as recited in the fourth aspect mentioned above, wherein the recording means comprises:

an optical head irradiating a laser spot light on the optical disc;

a BCA code memory for forming the BCA code constituted by a plurality of marks in the track direction by the laser spot light;

a secret code memory storing a secret code modulated in accordance with a previously determined procedure within a range capable of recognizing positions in the radial direction of the optical disc and/or positions in the track direction of a plurality of marks forming the BCA code as the BCA code, with respect to the BCA code stored in the BCA code memory; and a microprocessor controlling the BCA code and the secret code with respect to the optical head output control portion, and wherein the microprocessor constitutes an optical disc manufacturing apparatus or a BCA code recording apparatus which records the BCA code including the secret code on the optical disc surface by modulating the BCA code by using the secret code stored in the secret code memory while moving an optical head in the radial direction of the optical disc.

Further, in accordance with an eighth aspect of the present invention, there is provided an optical disc manufacturing method as recited in the fifth aspect mentioned above, wherein the recording step uses an optical head irradiating a laser spot light on the optical disc, a BCA code memory for forming the BCA code constituted by a plurality of marks in the track direction by the laser spot light, and a secret code memory storing a secret code modulated in accordance with a previously determined procedure within a range capable of recognizing positions in the radial direction of the optical disc and/or positions in the track direction of a plurality of marks forming the BCA code as the BCA code, with respect to the BCA code stored in the BCA code memory, and wherein the optical head records the BCA code including the secret code on the optical disc surface by modulating the BCA code by using the secret code stored in the secret code memory by irradiating a laser spot light on the optical disc while moving in the radial direction of the optical disc.

Further, in accordance with a ninth aspect of the present invention, there is provided a read-only or rewritable or recordable optical disc comprising:

a recording membrane on which data is recorded, the data being recorded and/or reproduced by irradiation of a laser spot on the recording membrane, wherein a BCA code recorded on the recording membrane is constituted by a plurality of marks, and includes a secret code which is modulated in accordance with a previously determined procedure in a range capable of recognizing a length in a radial direction of the optical disc and a width in a track direction of a plurality of marks as the BCA code.

Further, in accordance with a tenth aspect of the present invention, there is provided an illegal copy finding system finding an illegal copy of an optical disc on which data and a BCA code are recorded, comprising:

a recording apparatus recording on the optical disc the BCA code constituted by a plurality of marks and including a secret code which is modulated in accordance with a previously determined procedure in a range capable of recognizing a length in a radial direction of the optical disc and/or a width in a track direction of a plurality of marks as the BCA code;

a BCA history database storing a history including a correspondence between the BCA code of the optical disc recording the BCA code and the secret code; and a management center reading the BCA code and the secret code recorded on the optical disc so as to compare both on the basis of an input of the correspondence between the BCA code and the secret code stored in the BCA history database.

Further, in accordance with an eleventh aspect of the present invention, there is provided an illegal copy finding method of finding an illegal copy of an optical disc on which data and a BCA code are recorded, comprising:

a recording step of recording on the optical disc the BCA code constituted by a plurality of marks and including a secret code which is modulated in accordance with a previously determined procedure in a range capable of recognizing a length in a radial direction of the optical disc and/or a width in a track direction of a plurality of marks as the BCA code;

a storing step of storing a history including a correspondence between the BCA code of the optical disc recording the BCA code and the secret code in a BCA history database; and a comparing step of reading the BCA code and the secret code recorded on the optical disc so as to compare on the basis of an input of the correspondence between the BCA code and the secret code stored in the BCA history database.

Further, in accordance with a twelfth aspect of the present invention, there is provided an optical disc manufacturing apparatus manufacturing an optical disc, comprising:

a recording means for recording the BCA code constituted by a plurality of marks and including a secret code which is modulated in accordance with a previously determined procedure in a range capable of recognizing a length in a radial direction of the optical disc and/or a width in a track direction of a plurality of marks as the BCA code, on the optical disc.

Further, in accordance with a thirteenth aspect of the present invention, there is provided an optical disc manufacturing method of manufacturing an optical disc, comprising:

a recording step of recording the BCA code constituted by a plurality of marks and including a secret code which is modulated in accordance with a previously determined procedure in a range capable of recognizing a length in a radial direction of an optical disc and/or a width in a track direction of a plurality of marks as the BCA code, on the optical disc.

Further, in accordance with a fourteenth aspect of the present invention, there is provided an illegal copy finding system as recited in the tenth aspect mentioned above, wherein the recording apparatus comprises:

an optical head irradiating a laser spot light on the optical disc;

a BCA code memory for forming the BCA code constituted by a plurality of marks in the track direction by the laser spot light;

a secret code memory storing a secret code modulated in accordance with a previously determined procedure in a range capable of recognizing the lengths in the radial direction of the optical disc and/or the widths in the track direction of a plurality of marks forming the BCA code as the BCA code, with respect to the BCA code stored in the BCA code memory; and a microprocessor controlling the BCA code and the secret code with respect to the optical head output control portion, and wherein the microprocessor constitutes an optical disc manufacturing apparatus or a BCA code recording apparatus which records the BCA code including the secret code on the optical disc surface by modulating the BCA code by using the secret code stored in the secret code memory while moving an optical head in the radial direction of the optical disc.

Further, in accordance with a fifteenth aspect of the present invention, there is provided an optical disc manufacturing apparatus as recited in the twelfth aspect mentioned above, wherein the recording means comprises:

an optical head irradiating a laser spot light on the optical disc;

a BCA code memory for forming the BCA code constituted by a plurality of marks in the track direction by the laser spot light;

a secret code memory storing a secret code modulated in accordance with a previously determined procedure in a range capable of recognizing the lengths in the radial direction of the optical disc and/or the widths in the track direction of a plurality of marks forming the BCA code as the BCA code, with respect to the BCA code stored in the BCA code memory; and a microprocessor controlling the BCA code and the secret code with respect to the optical head output control portion, and wherein the microprocessor constitutes an optical disc manufacturing apparatus or a BCA code recording apparatus which records the BCA code including the secret code on the optical disc surface by modulating the BCA code by using the secret code stored in the secret code memory while moving an optical head in the radial direction of the optical disc.

Further, in accordance with an sixteenth aspect of the present invention, there is provided an optical disc manufacturing method as recited in the thirteenth aspect mentioned above, wherein the recording step uses an optical head irradiating a laser spot light on the optical disc, a BCA code memory for forming the BCA code constituted by a plurality of marks in the track direction by the laser spot light, and a secret code memory storing a secret code modulated in accordance with a previously determined procedure in a range capable of recognizing the lengths in the radial direction of the optical disc and/or the widths in the track direction of a plurality of marks forming the BCA code as the BCA code, with respect to the BCA code stored in the BCA code memory, and wherein the optical head records the BCA code including the secret code on the optical disc surface by modulating the BCA code by using the secret code stored in the secret code memory by irradiating a laser spot light on the optical disc while moving in the radial direction of the optical disc.

Further, in accordance with a seventeenth aspect of the present invention, there is provided an optical disc as recited in the first or ninth aspect mentioned above, wherein the recording membrane is constituted by a phase change recording membrane or a pigment system recording membrane in which a reflection factor is changed by irradiation of a laser spot.

Further, in accordance with an eighteenth aspect of the present invention, there is provided an illegal copy finding method as recited in the third or eleventh aspect mentioned above, wherein the recording step includes a step of recording the BCA code including the secret code on the optical disc surface by modulating the BCA code by using the secret code stored in the secret code memory while moving the optical head in the radial direction of the optical disc.

Further, in accordance with a nineteenth aspect of the present invention, there is provided an optical disc as recited in the first, ninth or seventeenth aspect mentioned above, wherein the marks of the BCA code are constituted by a plurality of bars extending in the radial direction of the optical disc, a width of the bar, a position of the bar in the radial direction of the optical disc, a distance between an innermost peripheral end side and an outermost peripheral end side on the basis of a rotation center of the optical disc, a distance between centers of the bars in the disc track direction, and a distance between bar starting ends are standardized, and the secret code is included in the BCA code by changing the bar recording position within a plurality of standards.

Further, in accordance with a twentieth aspect of the present invention, there is provided an illegal copy finding system as recited in the second, sixth, tenth or fourteenth aspect mentioned above, wherein the marks of the BCA code are constituted by a plurality of bars extending in the radial direction of the optical disc, a width of the bar, a position of the bar in the radial direction of the optical disc, a distance between an innermost peripheral end side and an outermost peripheral end side on the basis of a rotation center of the optical disc, a distance between centers of the bars in the disc track direction, and a distance between bar starting ends are standardized, and the secret code is included in the BCA code by changing the bar recording position within a plurality of standards.

Further, in accordance with a twenty first aspect of the present invention, there is provided an illegal copy finding method as recited in the third, eleventh or eighteenth aspect mentioned above, wherein the marks of the BCA code are constituted by a plurality of bars extending in the radial direction of the optical disc, a width of the bar, a position of the bar in the radial direction of the optical disc, a distance between an innermost peripheral end side and an outermost peripheral end side on the basis of a rotation center of the optical disc, a distance between centers of the bars in the disc track direction, and a distance between bar starting ends are standardized, and the secret code is included in the BCA code by changing the bar recording position within a plurality of standards. Further, in accordance with a twenty second aspect of the present invention, there is provided an optical disc manufacturing apparatus as recited in the fourth, seventh, twelfth or fifteenth aspect mentioned above, wherein the marks of the BCA code are constituted by a plurality of bars extending in the radial direction of the optical disc, a width of the bar, a position of the bar in the radial direction of the optical disc, a distance between an innermost peripheral end side and an outermost peripheral end side on the basis of a rotation center of the optical disc, a distance between centers of the bars in the disc track direction, and a distance between bar starting ends are standardized, and the secret code is included in the BCA code by changing the bar recording position within a plurality of standards. Further, in accordance with a twenty third aspect of the present invention, there is provided an optical disc manufacturing method as recited in the fifth, eighth, tenth or thirteenth aspect mentioned above, wherein the marks of the BCA code are constituted by a plurality of bars extending in the radial direction of the optical disc, a width of the bar, a position of the bar in the radial direction of the optical disc, a distance between an innermost peripheral end side and an outermost peripheral end side on the basis of a rotation center of the optical disc, a distance between centers of the bars in the disc track direction, and a distance between bar starting ends are standardized, and the secret code is included in the BCA code by changing the bar recording position within a plurality of standards.

In accordance with the present invention, it is possible to easily find an illegal copy of an optical disc by utilizing a feature that the secret code is included in the BCA code formed on the recording membrane of the optical disc and the secret code can not be recognized by the general optical disc reproducing apparatus.

DESCRIPTION OF REFERENCE NUMERALS

1: optical disc, 2: spindle motor, 2a: rotary encoder, 3: laser spot, 4: carriage motor, 5: linear scale, 6: base, 7: carriage, 8: optical head, 10: spindle control portion, 11: carriage control portion, 12: focus control portion, 13: laser output control portion, 14: microprocessor, 15: secret data generating portion, 16: BCA data generating portion, 61: modulation portion, 18: secret data superposition portion, 62: clock generating portion, 19: data interface portion, 60: host controller, 21: recording power, 22: bias power, 23: amorphous mark, 24: laser spot width, 25: initialization power, 30: management center, 31: secret code database, 32: secret code checker, 40: legal factory, 41: BCA code memory, 42: secret code memory, 44: BCA history database, 45: BCA management server, 46: optical disc manufacturing apparatus with BCA recording function, 47: checker, 48: secret code portion, 49: BCA portion, 50: illegal supplier, 51: optical disc copy apparatus.

BEST MODE FOR CARRYING OUT THE INVENTION

Figure 1:
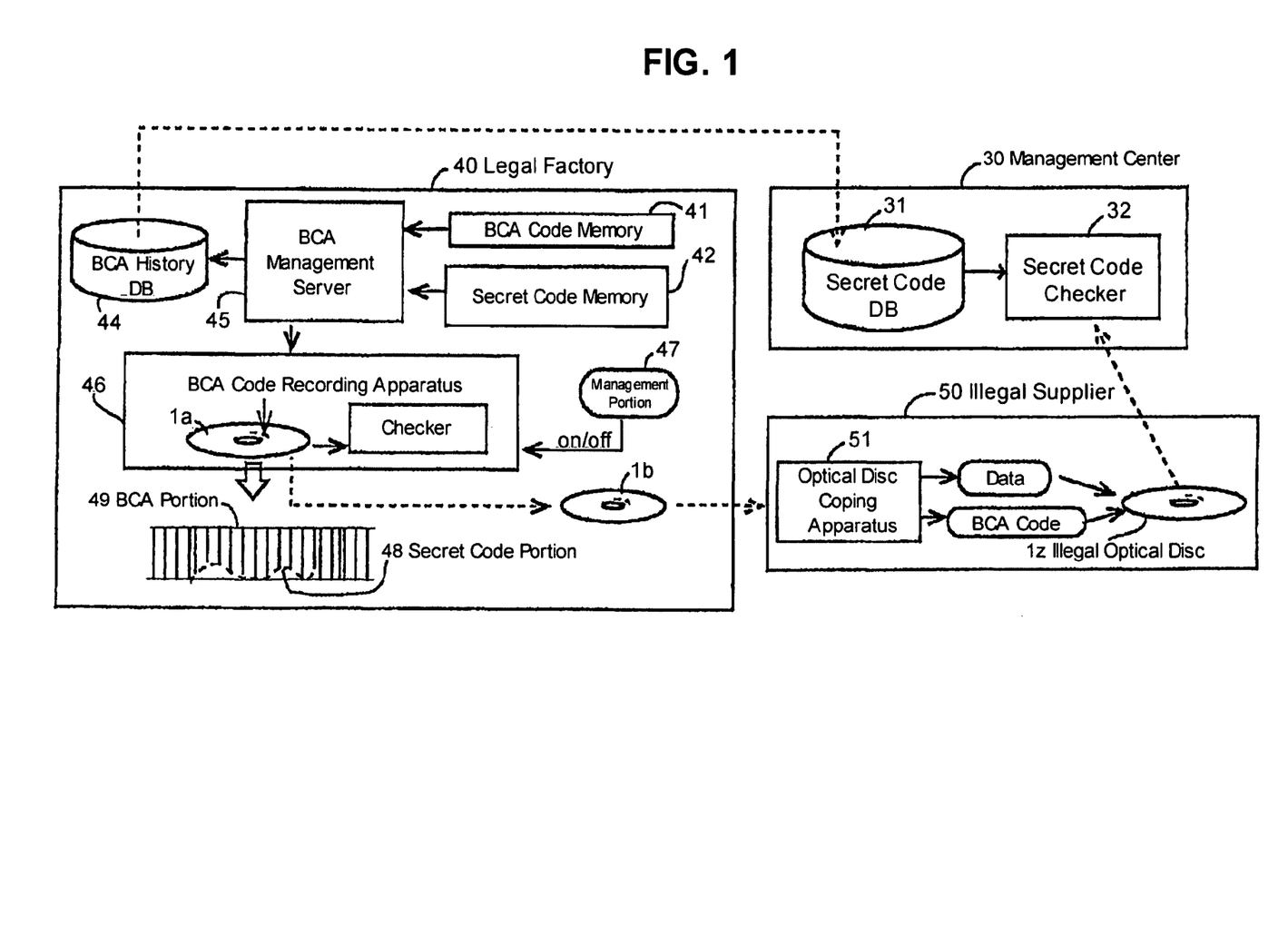
FIG. 1 is a view for explaining an illegal copy finding system in accordance with an embodiment of the present invention.
Figure 2:
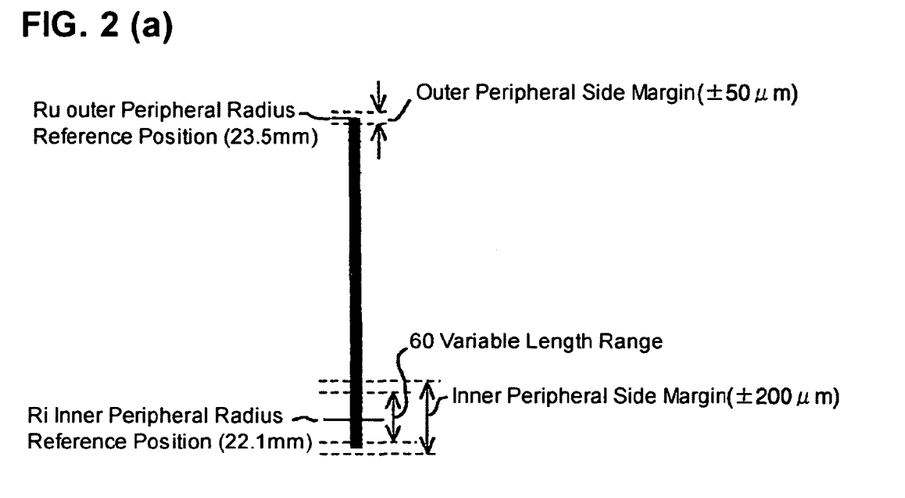
FIG. 2 is a view for explaining one example of a BCA code including a secret code in accordance with the present embodiment.
Figure 4:
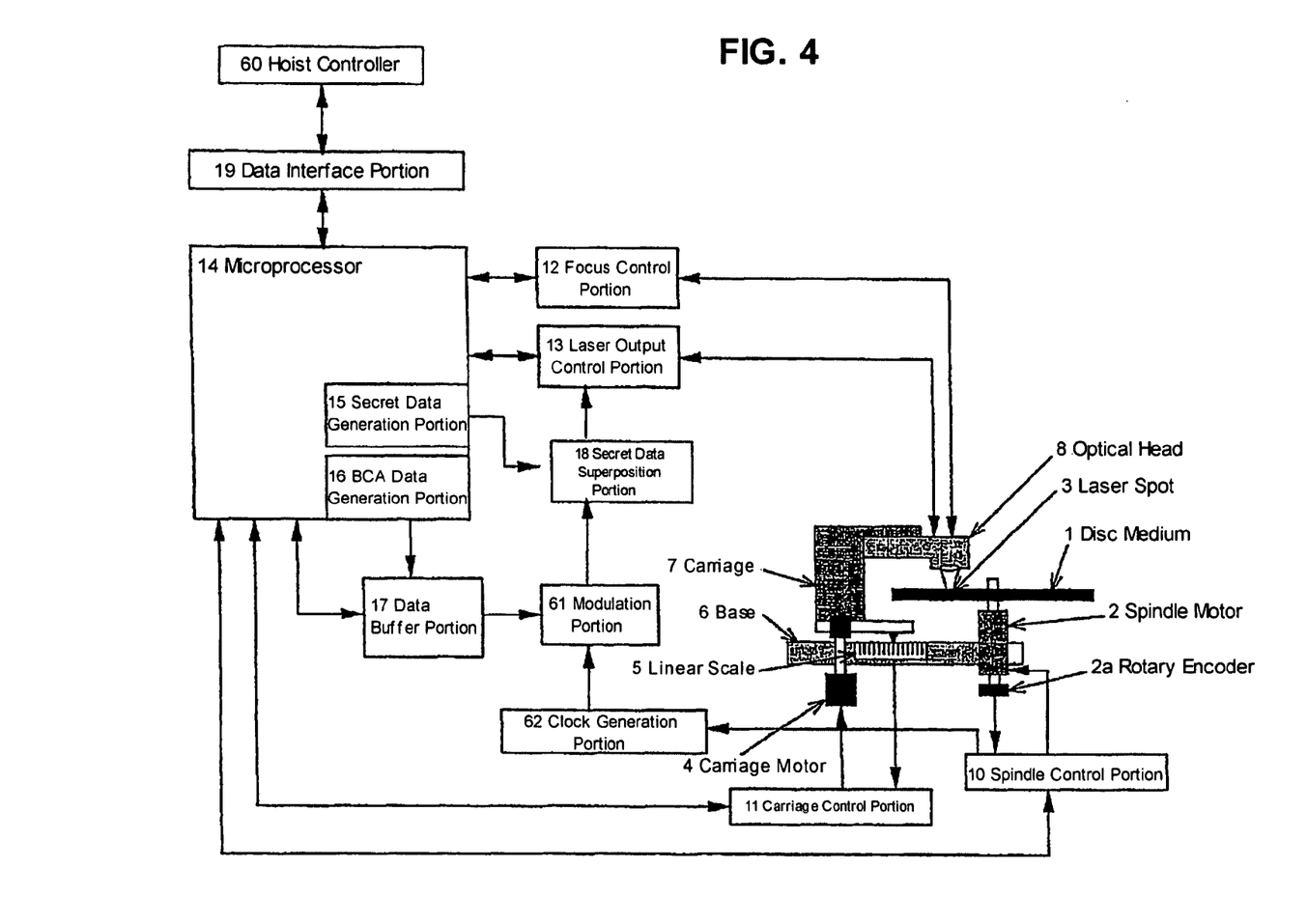
FIG. 4 is a view for explaining an optical disc manufacturing apparatus 46 for a phase change optical disc which is preferable for the present embodiment.
Figure 5:
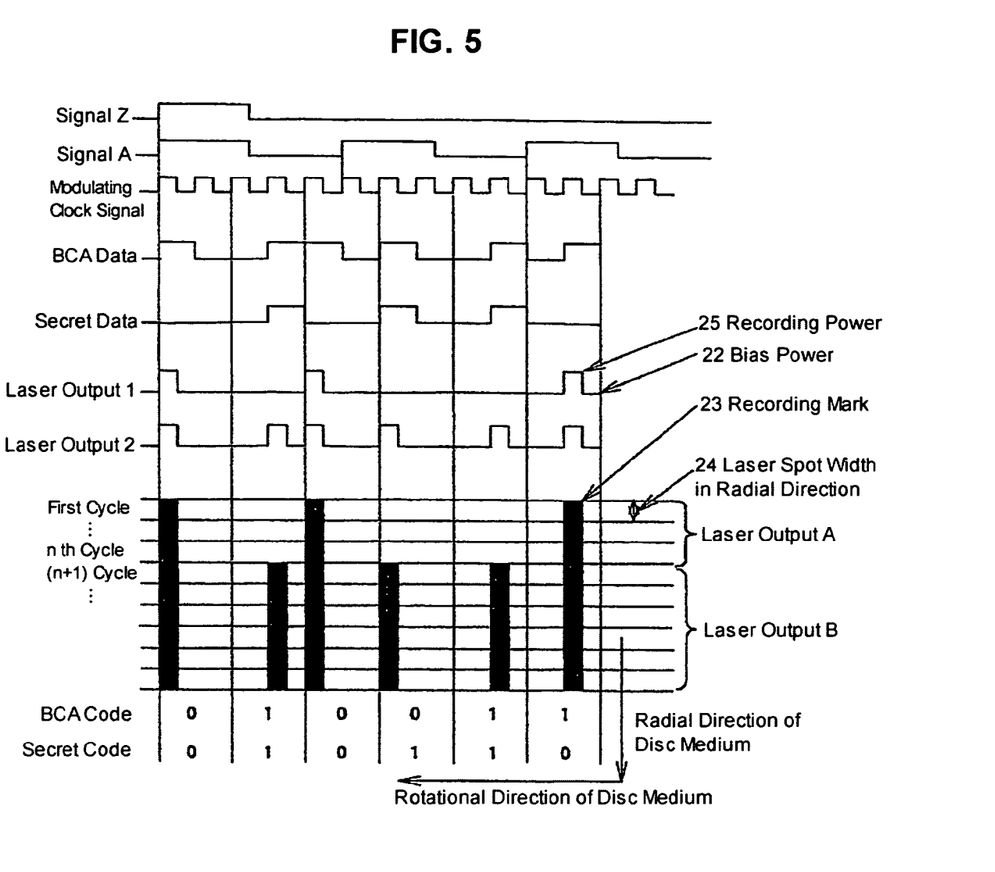
FIG. 5 is a time chart for explaining a principle of a recording operation of the BCA code.
Figure 6:
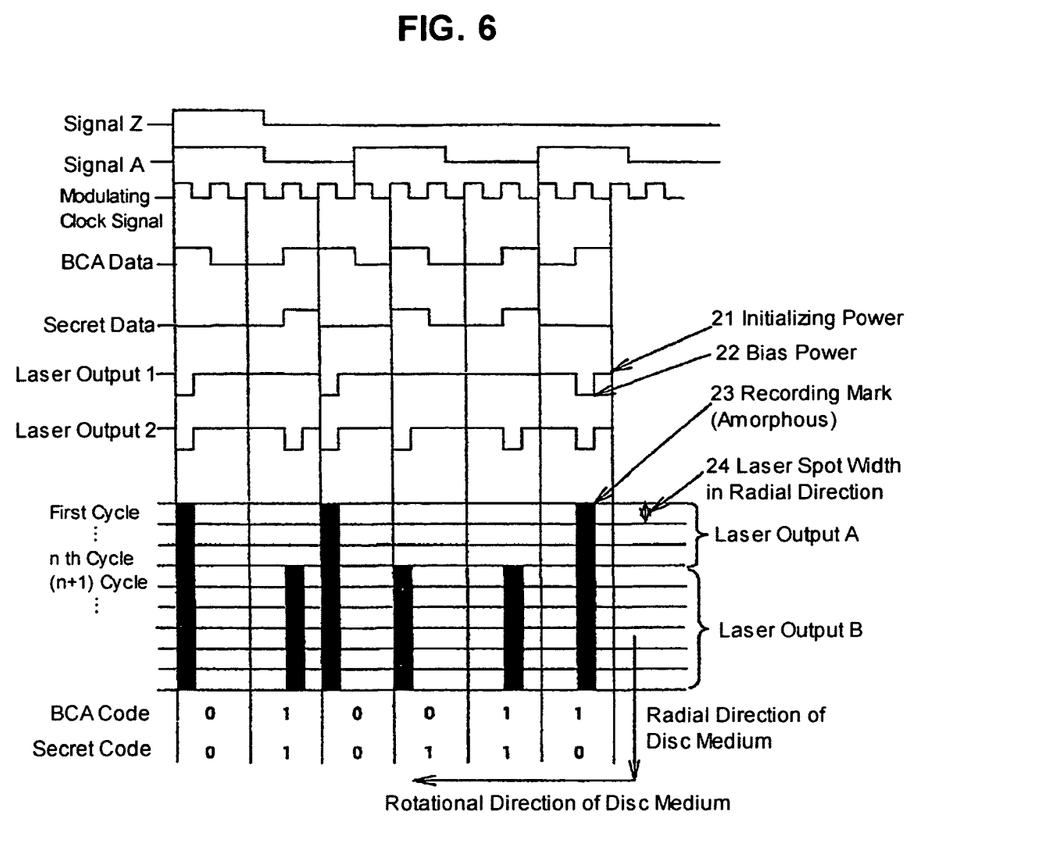
FIG. 6 is a time chart for explaining a principle of an initialization and the recording operation of the BCA code.
Figure 7:
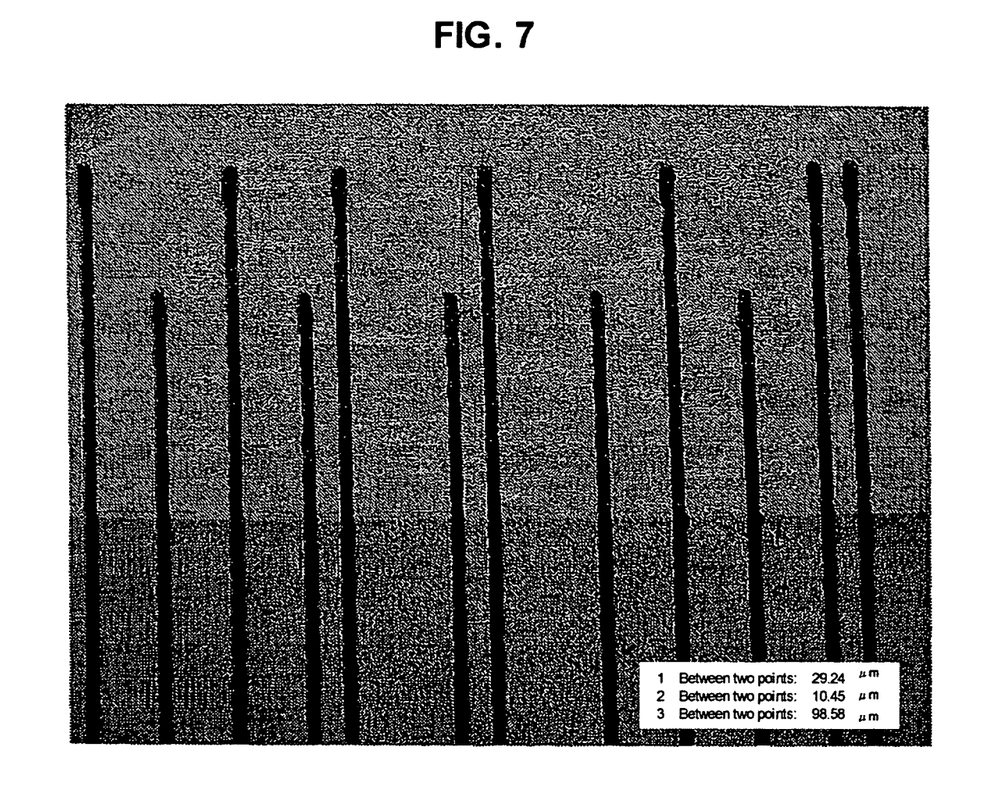
FIG. 7 is a photo view showing a state in which a mark is changed in a radial direction of an optical disc in accordance with the present embodiment.
Figure 8:
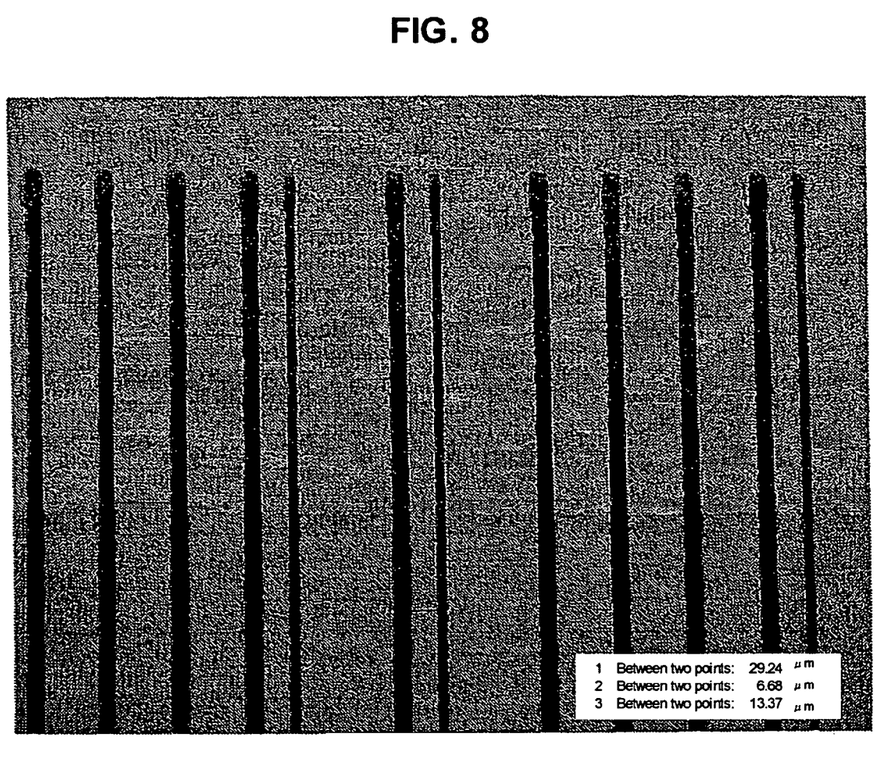
FIG. 8 is a photo view showing a state in which the mark is changed in a track direction of the optical disc in accordance with the present embodiment.

A description will be given below of an embodiment of an optical disc in accordance with an embodiment of the present invention, an illegal copy finding system and an illegal copy finding method using the optical disc, a manufacturing method of the optical disc, and a manufacturing apparatus of the optical disc with reference to the accompanying drawings. FIG. 1 is a view for explaining an entire structure of an illegal copy finding system (a secret code utilizing system) using an optical disc in accordance with the present embodiment, FIG. 2 is a view for explaining one example of a BCA code including a secret code in accordance with the present embodiment, FIG. 3 is a view for explaining another example of the BCA code including the secret code in accordance with the present embodiment, FIG. 4 is a view for explaining an optical disc manufacturing apparatus 46 disc which is preferable for the present embodiment, FIG. 5 is a time chart for explaining a principle of a recording operation of the BCA code with respect to a read-only or recordable optical disc, FIG. 6 is a time chart for explaining a principle of a recording operation of the BCA code with respect to a rewritable optical disc, FIG. 7 is a photo view showing a state in which a mark is changed in a disc radial direction of a DVD-ROM, and FIG. 8 is a photo view showing a state in which the mark is changed in a track direction of the DVD-ROM.

Explanation of Summary of Illegal Copy Finding System

An object of the present invention is to make it possible to easily find an illegal copy of an optical disc as mentioned above. A description will be given of an entire structure of an illegal copy entire system for this object with reference to FIG. 1.

First, in the illegal copy finding system in accordance with the present embodiment, it is premised that, as shown in FIG. 1, there are a legal factory 40 manufacturing an optical disc by recording a BCA code, an illegal supplier 50 getting the optical disc manufactured by the legal factory 40 and illegally copying the optical disc, and a management center 30 for inspecting the illegally copied optical disc in the market.

The BCA code is structured such as to include, for example, an identification number of an individual manufactured optical disc, a manufacturing factory number, a copyright notice of afterward recorded contents (motion picture, music or the like), a copyright owner name of the contents and the like, however, is not limited to those.

In particular, the legal factory 40 in accordance with the present embodiment is provided with a BCA code memory 41 storing an information relating to the BCA code, a secret code memory 42 storing an information relating to a secret code mentioned below, an optical disc manufacturing apparatus 46 recording the BCA code, a BCA management server (computer) 45 deforming (modulating) the BCA code stored in the BCA code memory 41 so that the secret code mentioned below is included therein and giving a command of recording the BCA code to the optical disc manufacturing apparatus 46, a management portion 47 for a legal manager by which only a manager having a legal authority instructs manufacturing the legal optical disc, and a BCA history database 44 storing an information relating to the BCA code including the secret code recorded on the manufactured optical disc.

The optical disc manufacturing apparatus 46 includes a mechanism of recording the BCA code and initializing a recording membrane in the case of a rewritable (phase change) disc on the basis of a structure and an operation mentioned below, and a checker for verifying the BCA code and the secret code recorded on the optical disc.

Further, the BCA code includes a BCA portion 49 constituted by a plurality of barcode-type marks (vertical bars in the present embodiment), and a secret code portion 48 is included in an inner portion of the BCA portion 49. The secret code portion 48 forms a unique recording pattern by changing a layout of the marks forming the BCA code within a range giving no influence to a reproduction of the BCA code itself, and can be recognized as an image information by the checker.

The illegal supplier 50 is provided with an optical disc copying apparatus 51 for copying a generally got optical disc 1$b$, and manufactures an illegal optical disc 1$z$ by reading the contents and the BCA code recorded on the optical disc 1$b$.

The management center 30 functions for finding the illegal optical disc 1$z$ which is illegally copied as mentioned above, is provided, for example, with a secret code database 31 storing a secret code corresponding to the BCA code got from the history database 44 of the legal factory 40 mentioned above, and a secret code checker 32 which can read the BCA code including the secret code of the optical disc, reads the secret code by the checker 32, and inspects legality of the optical disc by comparing with the secret code stored in the data base 31.

Then, a description will be given of a summary of the present system. The illegal copy finding system in accordance with the present embodiment easily finds the illegally copied optical disc by utilizing a feature that at a time when illegal supplier gets the legal optical disc 1$b$ manufactured in the legal factory 40 and the management center 30 inspects the illegal optical disc 1$z$ illegally manufactured by the illegal supplier 50, the illegal supplier 50 can not copy the secret code even if the illegal supplier 50 can copy the BCA code itself on the basis of a reason mentioned below.

Explanation of BCA Code and Secret Code

Next, a description will be given of the secret code included in the BCA code corresponding to a feature of the present invention with reference to FIGS. 2 and 3.

First, the BCA code in accordance with the present embodiment is structured such that a plurality of barcode-type marks (vertical bars) are arranged in line along an inner peripheral track of the optical disc, and the data of the copyright notice or the like mentioned above is formed by an interval of the marks. A recorded position (including length and width) of the mark constituting the BCA code is defined, for example, in accordance with a DVD standard, and a predetermined margin is defined in the standard with respect to a disc radial direction and a track direction.

For example, the recorded position of the mark in the disc radial direction in accordance with the DVD standard is set such that, for example, in the case of a DVD-ROM, an inner peripheral radial reference position Ri is 22.1 mm and an outer peripheral radial reference position Ru is 23.5 mm (accordingly, a reference mark length is 1.4 mm) on the basis of a center of the optical disc, as described below and as shown in FIG. 2A, an inner peripheral side margin of ±200 μm (±0.2 mm) is set with respect to the inner peripheral radial reference position, and an outer peripheral side margin of ±50 μm (±0.05 mm) is set with respect to the outer peripheral radial reference position.

Figure 3A:
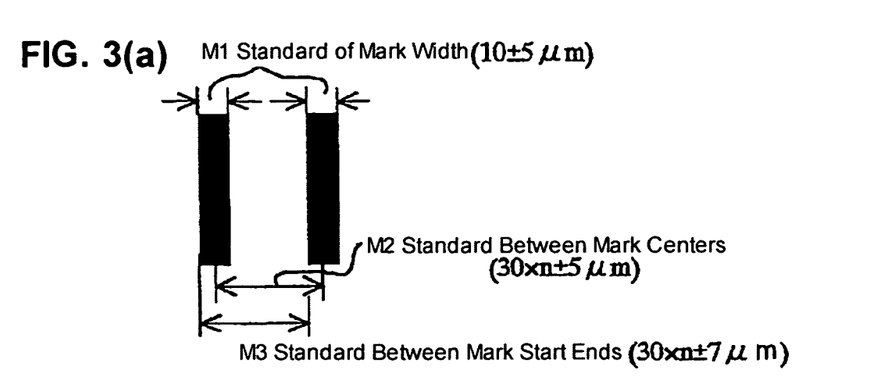
FIG. 3 is a view for explaining an other example of the BCA code including the secret code in accordance with the present embodiment.

(1) mark inner peripheral end side=22.1±0.2 mm
(2) mark outer peripheral end side=23.5±0.05 mm On the other hand, the recorded position of the mark in the disc track (circumferential) direction in accordance with the DVD standard is standardized as follows and as shown in FIG. 3A, for example, in the case of the DVD-ROM.

(3) mark width standard M1=10±5 μm
(4) standard of distance between mark centers M2=30×n±5 μm (n=1, 2, 3, 4)
(5) distance between mark start ends M3=30×n±7 μm (n=1, 2, 3, 4)

In this case, the reason for of n=1, 2, 3, 4 is that a portion between the marks becomes blank according to the contents of the barcode, and the mark is formed sporadicly and the maximum of n is 4.

On the other hand, in the case of taking into consideration an eccentricity component at a time of clamping the optical disc to the optical disc manufacturing apparatus 46, a positioning accuracy of a laser head and the like, a mechanical tolerance is about ±50 μm to the maximum.

In the case of taking into consideration a tolerance of the BCA code and the mechanical tolerance of the optical disc mentioned above, there can be understood that a range capable of changing the mark length in the disc radial direction of the mark of the BCA code becomes zero in an outer peripheral side due to the mechanical tolerance, as shown in FIG. 2A, however, a variable length range between 21.95 mm±50 μm and 22.25 mm±50 μm exists in an inner peripheral side.

Figure 3B:
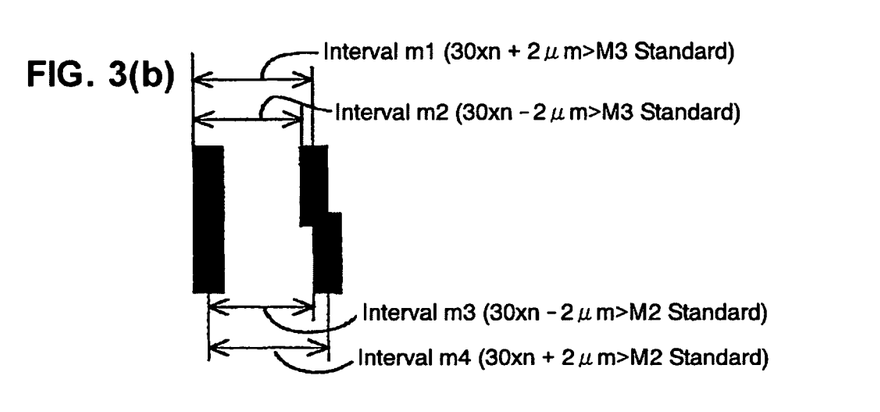
Figures 3C, 3D:
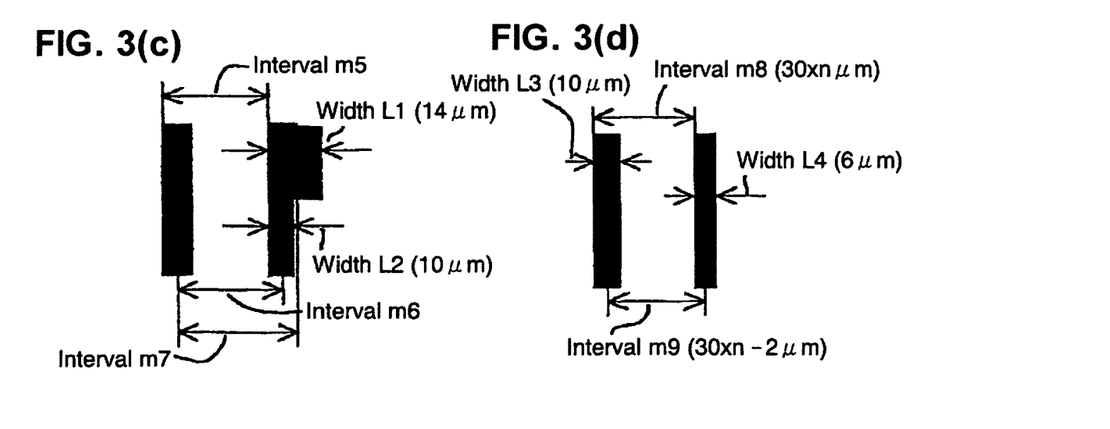

On the other hand, a range capable of changing the mark shape by changing the mark width and position in the disc track direction (the disc circumferential direction) of the mark of the BCA code is constituted by a shape in which a second mark has two steps as shown in FIG. 3B, a shape in which a second mark has one step as shown in FIG. 3C, and a shape in which widths of two marks is changed as shown in FIG. 3D. In particular, in the example shown in FIG. 3B, it is possible to deform the mark in the range satisfying the standard mentioned above by setting an interval m1 to (30×n+2) μm, an interval m2 to (30×n−2) μm, an interval m3 to (30×n−2) μm and an interval m4 to (30×n+2) μm. In the example shown in FIG. 3C, it is possible to deform the mark in the range satisfying the standard mentioned above by setting a mark start end interval m5 between first and second upper stages to (30×n) μm, a mark center interval m7 between the first mark center and the second upper stage center to (30×n+2) μm, a mark center interval m6 between the first mark center and the second lower stage center to (30×n−2) μm, a width L1 of the second upper mark to 14 μm, and a width L2 of the lower mark to 10 μm. In the example in FIG. 3D, it is possible to deform the mark in the range satisfying the standard by setting a mark start end interval m8 between the first and second upper stages to (30×n) μm, and an interval m9 between two mark centers to (30×n−2) μm.

The inventors pay attention to a matter that the mark of the BCA code mentioned above can be moved in a variable length range 60 in a disc radial direction shown in FIG. 2, and the BCA code can be normally reproduced by the optical disc reproducing apparatus or the like (the BCA code can be deformed in a range capable of being recognized as the BCA code), in the case that the mark is changed to a shape shown in FIGS. 3B to 3D (even if the mark is deformed within the standard range [margin]), and invented the present invention which can determine whether the optical disc is legal or illegal, by embedding the secret code in the BCA code on the basis of a plurality of marks by use of the mark length change and deformation, utilizing a feature that the secret code of the illegally copied optical disc can not be recognized by the general optical disc reproducing apparatus and can not be copied in the case that the legal optical disc is illegally copied, and determining the secret code mentioned above. In this case, in the present specification, the term "modulation" may be used for the purpose of including changing of a position and a shape of the BCA code.

Particularly explaining, in the deformation of the mark length in accordance with the present invention, as shown in FIG. 2B, the secret code is included in the BCA code by changing the mark length within the variable length range 60 of the mark in the disc inner peripheral side, thereby forming a secret code portion 48 having an undulation as shown in the drawing, and recognizing the undulation as an image data by the checker mentioned above. The mark shapes shown FIGS. 3B to 3D are changed in the same manner.

It can be considered that the BCA code in accordance with the present embodiment is deformed in the disc radial direction and the track direction, and is deformed in any one direction. However, when using the step as shown in FIGS. 3B and 3C, there can be considered that a noise is generated in a reproducing signal by the step mentioned above. Accordingly, as a practical deformation example, it is expected that a deformation obtained by combining a deformation in the disc radial direction shown in FIG. 2B and a deformation of the mark width shown in FIG. 3D is preferable.

Explanation of Optical Disc Manufacturing Apparatus 46

The optical disc manufacturing apparatus 46 (which may be called as the BCA code recording apparatus with respect to the other medium than the phase change optical disc) used in the present embodiment is provided, as shown in FIG. 4, with a spindle motor 2 rotating the optical disc 1, a rotary encoder 2a directly coupled to a rotation shaft of the spindle motor 2 so as to detect a rotation angle of the motor, an optical head 8 irradiating a laser spot 3 on the optical disc 1 so as to record the BCA code and initialize a recording membrane in the case of the rewritable (phase change) disc, a carriage 7 supporting the optical head 8 so as to be movable in a disc radial direction, a carriage motor 4 driving the carriage 7 in a radial direction, a linear scale 5 detecting a moving amount in a radial direction of the carriage 7, a base 6 supporting these mechanisms, a spindle control portion 10 controlling the rotation of the spindle motor 2 a carriage control portion 11 driving the carriage motor 4 so as to control a movement of the carriage 7, a focus control portion 12 executing a focus control of the laser spot on the disc surface of the optical head 8, a laser output control portion 13 controlling an output value of the laser spot 3, a data interface portion 19 relaying the secret code and the BCA code mentioned above from a host controller 60 included in the BCA management server 45, a microprocessor 14 including a BCA data generation portion 16 converting into a serial data in accordance with a format of the BCA code received from the data interface portion 19 and a secret data generation portion 15 converting into a serial data in accordance with a format of the secret code received from the host, a data buffer portion 17 storing the BCA data from the BCA data generation portion 16, a clock generation portion 62 generating a clock in synchronization with the disc rotation signal output from the spindle control portion 10, a modulation portion 61 modulating the BCA data of the data buffer 17 on the basis of the clock from the clock generation portion 62, and a secret data superposition portion 18 superposing the secret data from the secret data generation portion 15 on the BCA data modulated by the modulation portion 61. The optical disc manufacturing apparatus 46 is structured such as to initialize the optical disc and record the BCA code on the disc surface in the case that the optical disc 1 is constituted by the phase change optical disc on the basis of the command from the host controller 60, and only to record the BCA code in the case that the optical disc is not constituted by the phase change optical disc. In other words, the optical disc manufacturing apparatus 46 in accordance with the present embodiment is used as an initializing and BCA code recording apparatus in the case that the medium is constituted by the phase change optical disc, and is used as a BCA code recording apparatus in the case that the medium is constituted by the other.

The rotary encoder 2a is structured such as to output a signal Z (a pulse signal) generated per rotation of the disc in accordance with a predetermined angle of rotation of the disc in synchronization with the rotation of the spindle motor and a signal A (a pulse signal) in correspondence to the rotation angle, whereby the spindle control portion 10 can detect the rotation angle of the optical disc 1, and the rotary encoder 2a and a part of the spindle control portion 10 correspond to the detection portion of the present invention.

The clock generation portion 62 generates the clock in synchronization with the signal A mentioned above in accordance with PLL or the like, and is used as a clock for modulation by the modulation portion 17. Further, the linear scale 5 is structured such as to output a pulse signal per movement at a predetermined distance in synchronization with a linear movement of the carriage 7, whereby the carriage control portion 11 detects a moving amount of the carriage 7 and the optical head 8, detects a moving speed of the carriage 7 by detecting a pulse interval, and controls a position and a speed of the carriage by using the information.

Further, the focus control portion 12 feeds back a returned light reflected from the optical disc 1 and executes focusing control in such a manner as to prevent a diameter of the laser spot 3 irradiated from the optical head 8 from being changed on the optical disc 1, thereby executing the focus control of the laser spot while following to a surface vibration and a distortion of the optical disc 1. Further, the laser output control portion 13 controls such as to irradiate the laser light from the optical head 8 at an optional laser output width and an optional pulse interval in correspondence to the operation of initializing the recording surface and recording the BCA code. Further, the microprocessor 14 controls the spindle control portion 10, the carriage control portion 11, the focus control portion 12, the laser output control portion 13 and the data buffer portion 17, thereby executing the recording operation of the BCA code including the secret code and the initialization of the recording membrane in the case of the rewritable (phase change) disc.

Next, a description will be given of a principle of the recording operation of the BCA code with respect to the read-only recording medium (DVD-ROM) or the recordable recording medium (DVD-R) using the optical disc manufacturing apparatus 46 with reference to a time chart in FIG. 5.

FIG. 5 is a view showing a record mark (having a low reflection factor) formed on the disc medium by using the signal Z output per rotation of the disc output from the spindle control portion 10, the signal A outputting about 1000 pulses during one rotation of the disc and the modulating clock signal synchronized with the signal A output from the clock generation portion 18, and switching a laser output 1 in accordance with a pattern obtained by superposing the secret data on the BCA data output from the data buffer portion (being deformed in association), and a laser output 2 in accordance with a BCA data pattern obtained by not superposing the secret data (not being deformed) in the process of recording. In the case that the disc medium is constituted by the read-only disc (DVD-ROM), a recording power is set to a level at which the reflection membrane can be removed, and a bias power is set to a level at which the reflection membrane cannot be removed. In the case that the disc medium is constituted by the recordable disc (DVD-R), the recording power is set to a level at which a material state change of the recording membrane is obtained (the reflection factor becomes lower due to the pigment change), and the bias power is set to a level at which the material state change of the recording membrane is not obtained (the pigment change is not generated and the reflection factor can be maintained in a high state). In the recording mark line formed by the present embodiment, for example, in the case that a short mark length in the radial direction is defined as "1" and a long mark length is defined as "0", the secret data "010110" is included on the BCA code having the data "010011".

The present embodiment executes the deformation of the mark length in the radial direction by switching the laser pulse irradiation pattern at a time of recording the BCA in accordance with the secret data, however, for example, it is possible to deform a mark width in a track (circumferential) direction by switching a width of the modulation clock in accordance with the secret data.

As mentioned above, the optical disc manufacturing apparatus or the BCA code recording apparatus in accordance with the present embodiment is characterized in that the recording mark is formed in the radial shape by using the laser in which the laser spot length in the radial direction is shorter than the mark length in the radial direction of the BCA code, and executing a plurality of rotational recording operations while moving the laser spot in the radial direction. For example, in the case of the system of using the laser in which the laser spot length is equal to the mark length in the radial direction of the BCA code and forming the recording mark by one rotation, it is possible to deform the mark width in the circumferential direction, however, it is impossible to deform the mark length in the radial direction. In a modified embodiment therefor, it is possible to enlarge a freedom with respect to the deformation in the radial direction of the recording mark by making the laser spot in the radial direction shorter than the mark length in the radial direction of the BCA code. Accordingly, it is possible to achieve a complicated deformation, for example, as shown in FIG. 2B.

Further, in the case that the medium is constituted by the rewritable phase change optical disc (DVD-RAM, DVD-RW), the principle of the BCA recording operation of the optical disc manufacturing apparatus in accordance with the present embodiment makes it possible to record the BCA code including the secret data on the basis of the same operation, only by replacing the recording power shown in FIG. 5 by the bias power and replacing the bias power by an initializing power, as shown in a time chart in FIG. 6.

In this case, the initializing power is set to a level at which the material state change is obtained on the disc medium, that is, a level at which the phase change membrane is crystallized and the reflection factor becomes high, and the bias power is set to a level at which the material state change is not obtained on the disc medium, that is, a level at which the phase change membrane is not crystallized and the reflection factor can be maintained in a low state (an amorphous). The BCA code in this case is formed as an amorphous (non-crystallized) mark by the bias power.

As mentioned above, the recording of the BCA code in accordance with the present embodiment is started at a timing of the signal Z output from the spindle control portion 10 when the laser spot 3 is moved to a BCA code recording area on the optical disc 1 by the carriage control portion 11, and in the case that the laser spot width 24 in the radial direction, that is, the amorphous mark generated per rotation is less than a necessary length for the BCA code, the amorphous mark 23 is connected in the radial shape and the necessary length of the BCA code is recorded, by repeating the recording operation of the serial data stored in the data buffer portion 17 at some times after setting the moving amount per rotation of the carriage 7 to be equal to or less than the laser spot width 24.

Further, in the case that the medium is constituted by the phase change optical disc, it is possible to continue the initialization of the remaining tracks so as to execute the recording of the BCA code and the initialization of the recording membrane on the basis of a series of operations, by carrying on the laser irradiation on the basis of the initializing power 25 constituted by the laser output irradiated from the optical head 8 at a time point when the BCA code record in which the amorphous mark 23 obtains the necessary length of the BCA code is finished. In this case, the instruction of involving the secret code in the BCA code is executed by the management portion 47 shown in FIG. 1, and it is possible to involve the secrete code in the BCA code only by the legal manager having an authority.

Further, in the embodiment mentioned above, the description is given of the example in which the BCA management server 45 deforms the BCA code, however, the present invention is not limited to this, and the optical disc manufacturing apparatus 46 can record the BCA code including the secret code by independently inputting the respective information of the BCA code and the secret code, inhibiting the laser output at some cycle shown in FIGS. 5 and 6 by using the information of the secret code at a time of writing the BCA code, and changing the timing of the laser output.

As mentioned above, the optical disc manufacturing apparatus 46 in accordance with the present embodiment can record the BCA code including the secret code on the optical disc surface by irradiating an oval shaped laser spot light over a plurality of tracks on the optical disc, modulating all the serial data stored in the data buffer portion on the basis of the modulation clock from the clock generation portion per rotation, and executing a plurality of rotations while moving the carriage on the basis of the pulse drive of the laser light on the optical head by the optical head output control portion while detecting the rotation angle. Further, in the case of the phase change optical disc, it is possible to execute the initialization of the recording membrane and the recording of the BCA code on the basis of the series of operations.

Specific Example of BCA Code

FIGS. 7 and 8 are photos of the mark in the case of changing the BCA code in the radial direction and the track direction of the DVD-ROM disc in accordance with the embodiment mentioned above. As a result of at testing whether or not it is possible to accurately read the BCA code by using the optical disc in which the BCA code having the deformed recording position of the mark as mentioned above is changed, in other words, whether or not it is possible to read the BCA code without generating an error in the optical disc apparatus, the inventors have verified that the deformation of the BCA code in accordance with the embodiment can be used in the actual apparatus. Accordingly, the present invention can be achieved in the actual apparatus.

In this case, the BCA code constituted by a plurality of marks extending in the radial direction of the optical disc described in the embodiment mentioned above is desirably structured such that a fixed pattern is formed regardless of the contents of the BCA code (the variable length range of 188 byte at a maximum), in the portion where a predetermined number (for example, thirty nine) from the front end portion of the BCA code and a predetermined number (for example, forty six) before the final end of the BCA code are recorded, for example, in accordance with the DVD standard, and the deformation of the BCA code is recorded in the fixed pattern portion, in order to easily discriminate the secret code.

As mentioned above, the illegal copy finding system in accordance with the present embodiment can easily find the optical disc having the illegal copy because the illegal supplier does not have the copy technique for the secret code. Further, for example, in the case that the illegal employee or the like illegally manufactures the optical disc on a holiday or the like without operating the management portion 47 in the legal factory 40, the optical disc on which the BCA code including no secret code is recorded is manufactured. Accordingly, when inspecting the illegal optical disc in the management center 30, it is possible to find the illegal optical disc because the secret code is not included, and it is possible to specify the manufacturing factory where illegal manufacturing has been done, on the basis of the identification number and the manufacturing factory number included in the BCA code.

In this case, in the embodiment mentioned above, the description is given of the example in which the BCA code is formed in the bar shape extending in the radial direction of the disc, however, the BCA code in accordance with the present invention is not limited to the embodiment mentioned above. For example, in the case of employing such a BCA code as a two-dimensional barcode in which a lot of small black square marks are arranged in a surface shape, the present invention can be applied to the two-dimensional barcode. Further, in the embodiment mentioned above, the description is given of the example in which the secret code is included in the BCA code within the deformation allowable range of the BCA code, however, there can be considered a structure in which the independent secret code is arranged at a position so close as is hard to be differentiated from the BCA code by a visual observation, out of the standard range of the BCA code and out of the original data range, and there can be considered a structure in which a short secret code is arranged, for example, at a position beyond 23.5 mm+5μat the outer peripheral side in FIG. 2.

INDUSTRIAL APPLICABILITY

The illegal copy finding system in accordance with the present invention can easily find the optical disc of the illegal copy because the illegal supplier does not have any copy technique of the secret code. Further, for example, in the case that the illegal employee or the like illegally manufactures the optical disc on a holiday or the like without operating the management portion in the legal factory, the optical disc on which the BCA code including no secret code is recorded is manufactured. Accordingly, when inspecting the illegal optical disc in the management center, it is possible to find the illegal optical disc because the secret code is not included, and it is possible to specify the manufacturing factory where illegal manufacturing has been done, the basis of the identification number and the manufacturing factory number included in the BCA code.

What is claimed is:

1. An illegal copy finding system finding an illegal copy of an optical disc on which data and a BCA code are recorded, comprising:

a recording apparatus recording on the optical disc the BCA code constituted by a plurality of marks and including a secret code which is modulated in accordance with a previously determined procedure and the secret code forms an undulation with respect to the BCA code in a range capable of recognizing a recording position in a radial direction of the optical disc and a position in a track direction of said plurality of marks as the BCA code;

a BCA history database storing a history including a correspondence between the BCA code of the optical disc recording said BCA code and the secret code; and a management center reading the BCA code and the secret code recorded on the optical disc so as to compare both on the basis of an input of the correspondence between the BCA code and the secret code stored in said BCA history database;

an optical head irradiating a laser spot light on the optical disc;

a BCA code memory for forming the BCA code constituted by a plurality of marks in the track direction by said laser spot light;

a secret code memory storing a secret code modulated in accordance with a previously determined procedure in a range capable of recognizing positions in the radial direction of the optical disc and positions in the track direction of a plurality of marks forming the BCA code as the BCA code, with respect to the BCA code stored in said BCA code memory; and a microprocessor controlling the BCA code and the secret code with respect to said optical head output control portion, and wherein said microprocessor constitutes an optical disc manufacturing apparatus or a BCA code recording apparatus which records the BCA code including the secret code on the optical disc surface by modulating the BCA code by using the secret code stored in said secret code memory while moving an optical head in the radial direction of the optical disc.

2. An illegal copy finding method of finding an illegal copy of an optical disc on which data and a BCA code are recorded, comprising:

a recording step of recording on the optical disc the BCA code constituted by a plurality of marks and forming an undulating secret code with respect to the BCA code which is modulated in accordance with a previously determined procedure in a range capable of recognizing a recording position in a radial direction of the optical disc and a position in a track direction of said plurality of marks as the BCA code;

a storing step of storing a history including a correspondence between the BCA code of the optical disc recording said BCA code and the secret code in a BCA history database; and a comparing step of reading the BCA code and the secret code recorded on the optical disc so as to compare both on the basis of an input of the correspondence between the BCA code and the secret code stored in said BCA history database;
an optical head irradiating a laser spot light on the optical disc;
a BCA code memory for forming the BCA code constituted by a plurality of marks in the track direction by said laser spot light;
a secret code memory storing a secret code modulated in accordance with a previously determined procedure in a range capable of recognizing positions in the radial direction of the optical disc and positions in the track direction of a plurality of marks forming the BCA code as the BCA code, with respect to the BCA code stored in said BCA code memory; and
a microprocessor controlling the BCA code and the secret code with respect to said optical head output control portion, and
wherein said microprocessor constitutes an optical disc manufacturing apparatus or a BCA code recording apparatus which records the BCA code including the secret code on the optical disc surface by modulating the BCA code by using the secret code stored in said secret code memory while moving an optical head in the radial direction of the optical disc.

3. An illegal copy finding system finding an illegal copy of an optical disc on which data and a BCA code are recorded, comprising:
a recording apparatus recording on the optical disc the BCA code constituted by a plurality of marks and including a secret code which is modulated in accordance with a previously determined procedure and the secret code forms an undulation with respect to the BCA code in a range capable of recognizing a length in a radial direction of the optical disc and a width in a track direction of said plurality of marks as the BCA code;
a BCA history database storing a history including a correspondence between the BCA code of the optical disc recording said BCA code and the secret code; and
a management center reading the BCA code and the secret code recorded on the optical disc so as to compare both on the basis of an input of the correspondence between the BCA code and the secret code stored in said BCA history database;
an optical head irradiating a laser spot light on the optical disc;
a BCA code memory for forming the BCA code constituted by a plurality of marks in the track direction by said laser spot light;
a secret code memory storing a secret code modulated in accordance with a previously determined procedure in a range capable of recognizing positions in the radial direction of the optical disc and positions in the track direction of a plurality of marks forming the BCA code as the BCA code, with respect to the BCA code stored in said BCA code memory; and
a microprocessor controlling the BCA code and the secret code with respect to said optical head output control portion, and
wherein said microprocessor constitutes an optical disc manufacturing apparatus or a BCA code recording apparatus which records the BCA code including the secret code on the optical disc surface by modulating the BCA code by using the secret code stored in said secret code memory while moving an optical head in the radial direction of the optical disc.

4. An illegal copy finding method of finding an illegal copy of an optical disc on which data and a BCA code are recorded, comprising:
a recording step of recording on the optical disc the BCA code constituted by a plurality of marks and including a secret code which is modulated in accordance with a previously determined procedure and the secret code forms an undulation with respect to the BCA code in a range capable of recognizing a length in a radial direction of the optical disc and a width in a track direction of said plurality of marks as the BCA code;
a storing step of storing a history including a correspondence between the BCA code of the optical disc recording said BCA code and the secret code in a BCA history database; and
a comparing step of reading the BCA code and the secret code recorded on the optical disc so as to compare on the basis of an input of the correspondence between the BCA code and the secret code stored in said BCA history database;
an optical head irradiating a laser spot light on the optical disc;
a BCA code memory for forming the BCA code constituted by a plurality of marks in the track direction by said laser spot light;
a secret code memory storing a secret code modulated in accordance with a previously determined procedure in a range capable of recognizing positions in the radial direction of the optical disc and positions in the track direction of a plurality of marks forming the BCA code as the BCA code, with respect to the BCA code stored in said BCA code memory; and
a microprocessor controlling the BCA code and the secret code with respect to said optical head output control portion, and
wherein said microprocessor constitutes an optical disc manufacturing apparatus or a BCA code recording apparatus which records the BCA code including the secret code on the optical disc surface by modulating the BCA code by using the secret code stored in said secret code memory while moving an optical head in the radial direction of the optical disc.

5. An illegal copy finding system as claimed in claim 3, wherein said recording apparatus comprises:
an optical head irradiating a laser spot light on the optical disc;
a BCA code memory for forming the BCA code constituted by a plurality of marks in the track direction by said laser spot light;
a secret code memory storing a secret code modulated in accordance with a previously determined procedure in a range capable of recognizing the lengths in the radial direction of the optical disc and the widths in the track direction of a plurality of marks forming the BCA code as the BCA code, with respect to the BCA code stored in said BCA code memory; and
a microprocessor controlling the BCA code and the secret code, with respect to said optical head output control portion, and
wherein said microprocessor constitutes an optical disc manufacturing apparatus or a BCA code recording apparatus which records the BCA code including the secret code on the optical disc surface by modulating the BCA code by using the secret code stored in said secret code memory while moving an optical head in the radial direction of the optical disc.

6. An illegal copy finding method as claimed in claim 2 or 4, wherein said recording step includes a step of recording the BCA code including the secret code on the optical disc surface by modulating the BCA code by using the secret code stored in said secret code memory while moving the optical head in the radial direction of the optical disc.

7. An illegal copy finding system as claimed in claim 1, 3 or 5, wherein the marks of said BCA code are constituted by a plurality of bars extending in the radial direction of the optical disc, a width of said bar, a position of said bar in the radial direction of the optical disc, a distance between an innermost peripheral end side and an outermost peripheral end side on the basis of a rotation center of the optical disc, a distance between centers of said bar in the disc track direction, and a distance between bar starting ends are standardized, and the secret code is included in the BCA code by changing said bar recording position within said plurality of standards.

8. An illegal copy finding method as claimed in claim 2 or 4, wherein the marks of said BCA code are constituted by a plurality of bars extending in the radial direction of the optical disc, a width of said bar, a position of said bar in the radial direction of the optical disc, a distance between an innermost peripheral end side and an outermost peripheral end side on the basis of a rotation center of the optical disc, a distance between centers of said bar in the disc track direction, and a distance between bar starting ends are standardized, and the secret code is included in the BCA code by changing said bar recording position within said plurality of standards.

9. An illegal copy finding method as claimed in claim 6, wherein the marks of said BCA code are constituted by a plurality of bars extending in the radial direction of the optical disc, a width of said bar, a position of said bar in the radial direction of the optical disc, a distance between an innermost peripheral end side and an outermost peripheral end side on the basis of a rotation center of the optical disc, a distance between centers of said bars in the disc track direction, and a distance between bar starting ends are standardized, and the secret code is included in the BCA code by changing said bar recording position within said plurality of standards.

* * * * *